United States Patent [19]

Prin et al.

[11] Patent Number: 5,958,831
[45] Date of Patent: Sep. 28, 1999

[54] SIC FOAM CATALYST CARRIER WITH A REINFORCED SKIN AND CORRESPONDING CATALYTIC SYSTEMS

[75] Inventors: Marie Prin, Saint Cassien; Benoit Ollivier, Voiron; Airy Pierre Lamaze, Saint Cassien, all of France

[73] Assignee: Pechiney Recherche, Courbevoie, France

[21] Appl. No.: 08/955,093

[22] Filed: Oct. 21, 1997

[30] Foreign Application Priority Data

Oct. 21, 1996 [FR] France ................................ 96 13000

[51] Int. Cl.⁶ .............................. B01J 21/06; B01J 21/18; B05D 5/10; C01B 31/36
[52] U.S. Cl. .............................. 502/527.15; 502/527.14; 502/527.24; 502/439; 502/177; 502/178; 502/182; 502/200; 501/80; 501/81; 501/82; 501/83; 501/84; 501/85; 501/88; 427/244; 427/245; 428/423.1; 428/425.5; 423/445 R; 423/447.4
[58] Field of Search .................................. 501/88, 80, 81, 501/82, 83, 84, 85; 427/244, 245; 428/423.1, 425.5; 502/439, 527.14, 177, 200, 178, 182, 527.15, 527.24; 423/445 R, 447.4

[56] References Cited

U.S. PATENT DOCUMENTS

| 4,154,704 | 5/1979 | Vinton et al. | 210/39 |
| 4,812,434 | 3/1989 | Pohlmann et al. | 502/178 |
| 4,818,732 | 4/1989 | Fox et al. | |
| 5,154,970 | 10/1992 | Kaplan et al. | 428/304 |
| 5,429,780 | 7/1995 | Prin et al. | |

FOREIGN PATENT DOCUMENTS

| 337285A2 | 4/1989 | European Pat. Off. |
| 543752A1 | 11/1992 | European Pat. Off. |

Primary Examiner—Elizabeth D Wood
Attorney, Agent, or Firm—Dennison, Meserole, Scheiner & Schultz

[57] ABSTRACT

SiC foam-based catalyst carrier in the form of a moulded part having walls reinforced with a SiC skin having mechanical characteristics higher than those of the foam, this skin allowing the carrier to be handled and used without damage.

16 Claims, No Drawings

SIC FOAM CATALYST CARRIER WITH A REINFORCED SKIN AND CORRESPONDING CATALYTIC SYSTEMS

FIELD OF THE INVENTION

The invention relates to the field of catalytic systems and more particularly to SiC foam-based catalyst carriers.

STATE OF THE ART

A process for producing SiC foams and using them as catalyst carriers, in particular for exhaust pipes is already known.

PROBLEMS POSED

One of the problems posed by the use of SiC foams as catalyst carrier is the fragility and brittleness of this foam when subjected to the mechanical stresses resulting from handling of said carrier and from its positioning and fixing in a catalytic converter.

The object of the present invention is therefore to obtain a carrier which can be handled without physical damage, in particular by crumbling of the foam, and which withstands the pressure required for fixing such a carrier in a catalytic converter.

A further problem posed by the use of these SiC foams as carrier is the heterogeneity of the final dimensions issuing from the various stages of the manufacturing process as described in the application FR-A1-2705340.

Since the catalytic system has to be introduced into a metallic exhaust pipe casing having predetermined dimensions, any significant dimensional heterogeneity of the catalyst carrier is not tolerable.

OBJECTS OF THE INVENTION

The invention firstly relates to a SiC foam catalyst carrier having a reinforced skin.

A second object is a process for producing this SiC foam carrier with a reinforced skin.

The invention also relates to catalytic systems incorporating such a carrier.

DESCRIPTION OF THE INVENTION

The invention is a SiC foam-based catalyst carrier in the form of a monolithic moulded part having improved mechanical strength, characterised in that:

a) said part has external (also known as lateral) walls (or surfaces) not intended to be traversed by a flux subjected to the action of said catalyst comprising a mechanical reinforcing skin b) said skin comprises SiC and has mechanical characteristics better than those of said foam so as to obtain a high gradient of mechanical characteristics at the interface between skin and SiC foam c) the thickness of said skin is selected so as to allow the handling and transformation of said carrier into a catalytic system, then the subsequent use of said catalytic system, in particular without crumbling of said carrier.

Said external walls which are not intended to allow the passage of the flux to be treated by the catalyst can therefore be completely or only partially covered by the skin.

A density gradient also exists at the skin/foam interface and is selected so as to ensure the cohesion between the foam body (intended to receive the catalyst) and the skin; this cohesion must be maintained during manufacture of said carrier, its transformation into a catalytic system or the use of said catalytic system.

The density gradient between the skin and the foam extends over a thickness of at least 5%, preferably 10%, of that of the skin to ensure cohesion between the skin and the foam.

In fact the skin, which generally has a thickness greater than 0.5 mm, is based essentially on SiC and is obtained, as will be seen in detail hereinafter, by reinforcing the lateral surface of a moulded part of SiC foam having a high specific surface area with SiC over a certain thickness such that there is finally continuity between the foam body and the skin, the skin having lost the majority of the visible macroporosity (pores generally greater than 1 mm) of the foam from which it originated but having gained mechanical characteristics.

Therefore, the carrier according to the invention not only has very good resistance to compression and to crumbling and can be machined very easily owing to its very strong skin, but also has very good resistance to shearing between its skin and foam body with a high specific surface area owing to the continuity of the material between skin and foam.

The skin typically has mechanical resistance to crushing at least five times higher than that of the foam and/or a mean density at least five times higher than that of the foam.

Reinforcing elements normally in divided and/or dispersed form can be included in the skin. These are mainly mineral charges of the refractory or inert type, in the form of particles, fibres . . . such as oxides, carbon, carbides (for example SiC), nitrides or combinations thereof.

It should be noted that this skin does not have the properties and effectiveness of an active catalytic carrier. In fact, the catalytic phase which could be deposited thereon would have almost non-existent effectiveness as the millimeter-sized pores which allow free circulation of the gases to be treated have disappeared, as already mentioned. Therefore, the skin no longer has a foam structure through which said gases can pass but has the structure of a porous solid, for example of the porous refractory brick type. The losses of charge for the same gas speed are typically 100 to 1000 times higher in the skin than in the foam, the density five to fifteen times higher whereas the specific surface area can remain of the same magnitude.

Said skin can be impregnated with an inert product, for example wax or paraffin, prior to transformation of said carrier into a catalytic system by deposition of active phase on the foam, said impregnation preventing the active phase from being uselessly deposited in the skin.

The carrier (foam body and skin) according to the invention has a BET specific surface area of at least 1 $m^2/g$, typically between 1 and 40 $m^2/g$ and normally between 5 and 40 $m^2/g$. Resistance to crushing improved by a factor of at least 2, preferably 5, between a foam carrier having a skin and the same foam carrier without skin is also noted. Furthermore, the density of the skin is at least twice, preferably five times, higher than that of the foam. The carrier does not contain more than 0.5% (preferably 0.1%) of residual Si.

The invention also relates to a process for producing a catalyst carrier as described hereinbefore, in which:

a) a polyurethane foam moulded part is impregnated with a suspension of Si powder in an organic resin containing oxygen and preferably containing 1 to 10% by weight of crosslinking agent, the ratio by weight of Si to resin generally being between 0.55 and 1.20, said suspension, powder and resin being so-called "foam" suspension, powder and resin b) the excess of "foam" suspension is removed for example by centrifugation, compression, spin-drying; the ratio of the mass of "foam" resin impregnating the polyurethane to the mass of polyurethane is therefore typically between 3 and 9;

c) the "foam" resin contained in the polyurethane foam is crosslinked (or polymerised) by gradually raising the temperature; this thermal treatment generally involves a rate of rise in temperature of at least 3° C./min, preferably about 5° C./min to a temperature between 200 and 400° C., preferably 200 to 300° C., while maintaining this temperature for at least 5 minutes, typically between 5 and 90 minutes;

d) after cooling, a mixture of Si powder, organic resin preferably containing 1 to 10% by weight of crosslinking agent and advantageously a reinforcing mineral charge is applied to all or part of the external walls not to be traversed by the flux of product to be treated with said catalyst carrier; said mixture, powder and resin are so-called "skin" mixture, powder and resin; the ratio by weight of "skin" Si powder to "skin" resin is advantageously between 0.55 and 1.20;

e) the "skin" resin applied to the external walls of the polyurethane foam is crosslinked (or polymerised) by a heat treatment generally identical to that in stage c);

f) the polyurethane foam and the "skin" and "foam" resins are simultaneously carbonised by gradually raising the temperature typically to 1000° C. in a non-oxidising atmosphere and preferably with a rate of rise in temperature of between 1 and 10° C./min or more preferably 1 to 5° C./min;

g) the "foam" and "skin" Si powders are carburised and the "foam" and "skin" carbon obtained during the preceding stage is simultaneously silicided typically by gradually raising the temperature from 1000° C. to a temperature between 1300° C. and 1600° C., with a rate of rise in temperature lower than 10° C./min, preferably between 1 and 4° C./min, in an inert atmosphere and maintenance of the temperature for at least 0.5 h, preferably 2 to 5 hours at said temperature T, still in a non-oxidising atmosphere;

h) the residual carbon is removed by oxidation of the product, generally between 650° C and 950° C.

The mineral charge, for example a fine powder of SiC, introduced into the "skin" suspension in particular allows the deviations in coefficient of contraction between the foam body and the skin to be reduced and therefore prevents embrittlement of the skin/foam connection. Furthermore, it tends to block the specific surface area of the skin, preventing useless deposition and loss of catalytic phase in the skin.

The solid part can be machined after each of the crosslinking stages (c, e) in the knowledge that the process according to the invention provides very homogeneous dimensional shrinkage in the final carrier and therefore a very good range of accuracy.

A variation of the process involves starting from a SiC foam moulded part having a high specific surface area, which can be obtained by combining the above-described stages a, b, c, f, g or by any process such as those described in the foregoing state of the art, and applying the above-described stages d, e, f, g, h to this SiC foam.

Stage d) of application of the "skin" mixture can be carried out by any known means so that the mixture penetrates into the polyurethane or SiC foam through its external surface in a depth which is that desired for the skin, in general greater than 0.5 mm.

This application is carried out, for example, using one or more nozzles which spray said "skin" mixture onto the foam part in one or more passes or by soaking the external surface in the "skin" mixture. The thickness of penetration of the mixture is adjusted by means of the flow of mixture, the soaked thickness, the viscosity of said mixture, its temperature, the speed of application, the number of passes, etc. The optional reinforcing mineral charge is based, for example, on SiC particles or fibres.

Instead of applying the "skin" mixture directly to the polyurethane or SiC foam, it can be applied, at least locally, by means of a carrier so as to incorporate said intermediate carrier in the final catalyst carrier. The intermediate carrier can be of the film or sheet type which can disappear during carbonisation, by giving carbon (for example synthetic or typically cellulosic natural materials) to ensure the skin/foam cohesion or again a carrier of the woven, mesh or perforated tape type which allows passage of the "skin" mixture and remains after heating.

Said intermediate carrier can be coated with said "skin" mixture before it is applied to the external walls. The intermediate carrier is therefore incorporated in the catalytic carrier at predetermined points of the external walls.

It is advantageous to select, for a given composition of "foam" suspension, a "skin" mixture which allows any loss of cohesion between the foam and the skin due to the different shrinkage of the foam and the skin during thermal treatment to be avoided.

If the moulded part has an axis of symmetry, it is advantageous to carry out stage c) involving crosslinking of the "foam" resin in a rotating reactor, thus avoiding deformation or adhesion of the foam under the influence of its weight before it hardens completely.

The invention also relates to the catalytic systems produced from the carrier according to the invention.

A catalytic system of this type generally comprises, in addition to said carrier, a catalyst (or active catalytic phase) deposited on the SiC foam, all of which can be enclosed in a metallic casing in which there circulates a gas to be treated, for example car exhaust pipe and gas. In particular in this case, the carrier can be coated with a layer of ceria on which platinum and rhodium are deposited. To limit the deposition of expensive active phase in the skin, a "skin" mixture containing a mineral charge can be used and/or the skin can be treated with an inert product of the wax or paraffin type, as already seen. The skin therefore has a percentage by weight of active phase which is preferably less than 10%, or even less than 1%, of that of the active phase contained in the foam. The loss of catalyst can also be reduced by limiting the thickness of the skin.

EXAMPLES

Example 1

SiC foam-based carriers with a skin having a thickness of about 3 mm were produced in the form of a cylinder having a diameter of 60 mm and a length of 100 mm according to the invention in the following manner:

impregnation of 36 g of 45 ppi (pores per inch) polyurethane foam with an Si-containing foam suspension (foam mass/resin mass=0.7) in furfuryl resin with 3% by mass of crosslinking agent (hexamethylenetetramine): the impregnated block has a mass of 470 g (resin/polyurethane foam mass 7.09).

stoving at 200° C. for 1 hour in a rotating cage avoiding adhesion and deformation of the foam; rate of rise in temperature: 5° C./min; mass after stoving: 338 g

- machining of four parts having a diameter of 60 mm, a length of 100 mm and a mass of 33 g
- coating of the lateral surfaces of the parts, while leaving the ends of the cylinders free for the subsequent passage of the flux to be treated by the catalyst, with a "skin" mixture containing silicon and furfuryl resin with 3% by mass of crosslinking agent (Si mass/resin mass=0.7), using a nozzle; the "skin" mixture is brought to 60° C. and is located in a tank under pressure (about 1 bar). This allows a continuous jet of 3 mm to be obtained over the nozzle and a flow rate of 21 g/min of mixture. A contiguous skin is obtained with a rate of advance of the nozzle of 35 mm/min and rotation of the foam at 16 rpm
- stoving of the foam including the deposit of "skin" mixture in a rotating cage to prevent adhesion, with a rise at 5° C./min from ambient temperature to 200° C. for 15 minutes. Mass of a part after stoving: 79.4 g
- carbonisation then carburisation of the silicon and silicidation of the carbon obtained during carbonisation by a rise in temperature at 5° C./min from ambient temperature to 250° C. then at 3° C./min from 250° C. to 1370° C. and maintenance at 1370° C. for 4 hours; this is all carried out under a stream of argon circulating with a linear velocity of 3.5 cm/s (TPN). The mass after synthesis is 55.6 g
- the excess of residual carbon is removed by oxidation in air at 810° C. (7% of residual carbon).

The carrier (foam plus skin) has a specific surface area of 14.5 m$^2$/g and mechanical resistance to crushing of 14 bar measured between two parallel plates for a skin thickness of 3±0.5 mm. It is obvious that such resistance to crushing measured on the finished carrier depends not only on the intrinsic quality of the foam and of the skin but also on the size of the carrier, the thickness of the skin, in other words the geometric characteristics of the carrier components.

The foam alone has resistance to crushing of 0.3 bar.

The density of the foam is 0.09 g/cm$^3$.

The mean density of the skin is 1.10 g/cm$^3$: in the vicinity of the foam, this density is between 0.09 and 1.10 g/cm$^3$. Such a gradient produces cohesion between skin and foam.

Example 2

A carrier having a discontinuous skin has been produced in this example. The cylindrical polyurethane foam part containing the crosslinked "foam" suspension has a diameter of 150 mm and a length of 140 mm. The temperature of the "skin" mixture is 60° C. and the flow rate of mixture is 20 g/min.

With a rate of advance of the nozzle of 55 mm/min and a speed of rotation of 5.5 rpm, a skin having the form of a disconnected spirally wound strip (helix) was produced on the lateral surface of the cylinder with a pitch of 1 cm.

After transformation into silicon carbide, the mechanical resistance to compression of the monolithic carrier is 9 bar.

Other designs can be produced by the same method, for example intersecting spirals, rings and/or disconnected generatrices, etc.

Example 3

A catalytic carrier of which the skin has been or has not been treated with an inert substance was compared in this example. A carrier was firstly treated in order to produce a catalytic deposit containing a deposit of ceria then a deposit of Pt without the skin having been treated with an inert substance.

The skin of the carrier has a porosity of 5% with pores having diameters between 100 and 300 μm.

After impregnation to produce deposits of active catalytic phase, the skin, like the SiC foam body, contains (in % by weight) 30% of ceria then 0.4% of Pt in the skin and 0.8% of Pt in the foam.

The skin of an identical catalytic carrier was then treated with Siliplast TP 6000 wax (registered trade mark belonging to the company Zschimmer & Schwarz in Lahnstein/Rhine) having a melting point of 102° C. by daubing, the skin being kept at 120° C. and the foam at 20° C.

After deposition of the active phases as before, it was noted that the skin contains only 5% of ceria and 0.06% of Pt (in % by weight) and that the foam contains normal quantities of 28% of albanite and 0.9% of Pt.

We claim:

1. SiC foam based catalyst carrier in the form of a monolithic part of improved mechanical strength, said monolithic part comprising:

a SiC foam core, and an external surface comprising a skin comprising SiC of thickness at least 0.5 mm which covers said foam core and mechanically reinforces said part, the skin having mechanical characteristics better than those of the foam core so as to produce a gradient of mechanical characteristics at an interface between the foam core and the skin, a portion of the external surface not being covered by the skin.

2. A process for obtaining the catalyst carrier of claim 1, comprising the steps of:

a) impregnating a polyurethane foam molded part with a foam mixture comprising a suspension of Si powder in an organic resin containing oxygen;

b) removing excess foam mixture from the impregnated molded part;

c) crosslinking the resin impregnated in the part by a gradual rise in temperature;

d) cooling the part with crosslinked resin, and applying to external surfaces thereof a skin mixture comprising Si powder and organic resin;

e) crosslinking the resin in the skin mixture by a gradual rise in temperature of the part to which the skin mixture has been applied;

f) subjecting the part with crosslinked skin mixture to a gradual rise in temperature in a non-oxidizing atmosphere to an extent sufficient to simultaneously carbonize the polyurethane foam, the crosslinked impregnated resin and the crosslinked resin of the skin mixture;

g) carburizing the Si powder of the carbonized crosslinked impregnated resin and the carbonized crosslinked resin of the skin mixture by a gradual rise in temperature and reaction with carbon produced by said carbonizing; and h) removing any residual carbon after said carburizing by oxidation, to obtain the catalyst carrier.

3. Carrier according to claim 1, wherein there is a density gradient at the interface which ensures cohesion between the skin and the foam.

4. Carrier according to claim 1, wherein, said carrier has at least one of the following properties: mechanical resistance to crushing which is at least twice that of the same carrier without a skin and a mean skin density at least five times higher than that of the foam.

5. Carrier according to claim 1, wherein the skin comprises mechanical reinforcing elements in the form of a mineral charge and/or an intermediate carrier.

6. Carrier according to claim 1, wherein the skin contains an inert product.

7. Carrier according to claim 1, having at least one of the following characteristics: a BET specific surface area greater than 1 $m^2/g$, and a residual Si content of at most 0.5%

8. Catalytic system comprising the catalyst carrier according to claim 1, in combination with a catalyst deposited on the foam core and optionally, a casing enclosing said carrier and catalyst.

9. Catalytic system according to claim 8, wherein the catalyst comprises a ceria deposit covered with a Pt and Rh deposit.

10. Catalytic system according to claim 9, wherein the skin of the catalytic carrier has a catalyst content which is less than 10% of that of catalyst contained in the foam core.

11. Process according to claim 2, wherein the part is machined after at least one of steps c) and e).

12. Process according to claim 2, wherein a skin mixture is selected based on the foam mixture so that its shrinkage does not lead to loss of cohesion between the foam and the skin.

13. Process according to claim 2, wherein the skin mixture is applied by spraying using at least one nozzle or by soaking.

14. Process according to claim 2, wherein the skin mixture is applied to the external surfaces by application to a carrier, said intermediate carrier optionally being coated before application with the skin mixture.

15. Process according to claim 2, wherein the moulded part has an axis of symmetry, and the crosslinking step c) is carried out in a rotating reactor in order to set the part into rotation around said axis of symmetry.

16. Process according to claim 2, additionally comprising treating the skin of the catalyst carrier with an inert product.

* * * * *